United States Patent [19]

Lamm

[11] Patent Number: 4,652,633
[45] Date of Patent: Mar. 24, 1987

[54] SULFO-CONTAINING HALOPHENYLAZODIAMINO, CYANO PYRIDINE COMPOUNDS

[75] Inventor: Gunther Lamm, Hassloch, Fed. Rep. of Germany

[73] Assignee: BASF Aktiengesellschaft, Ludwigshafen, Fed. Rep. of Germany

[21] Appl. No.: 702,067

[22] Filed: Feb. 15, 1985

[30] Foreign Application Priority Data

Feb. 18, 1984 [DE]  Fed. Rep. of Germany ....... 3405859

[51] Int. Cl.$^4$ ............. C09B 29/01; C09B 29/42; D06P 1/39; D06P 3/24
[52] U.S. Cl. ................... 534/773; 260/508; 534/573; 534/581; 534/582; 534/772; 534/781; 534/783; 534/784; 534/785; 534/791; 534/794; 564/218
[58] Field of Search ............ 534/772, 791, 773, 753, 534/784, 785, 781, 783

[56] References Cited

U.S. PATENT DOCUMENTS

| | | | |
|---|---|---|---|
| 3,907,769 | 9/1975 | Dehnert et al. | 534/773 |
| 3,979,378 | 9/1976 | Enad et al. | 534/772 |
| 4,145,341 | 3/1979 | Dehnert et al. | 534/781 X |
| 4,359,418 | 11/1982 | Lienhard et al. | 534/772 X |

FOREIGN PATENT DOCUMENTS

| | | | |
|---|---|---|---|
| 0035172 | 9/1981 | European Pat. Off. | 534/773 |
| 0048538 | 3/1982 | European Pat. Off. | 534/780 |
| 3316887 | 11/1984 | Fed. Rep. of Germany | 534/772 |
| 73-09557 | 1/1974 | Netherlands | 534/773 |
| 2067585 | 7/1981 | United Kingdom | 534/781 |

Primary Examiner—Floyd D. Higel
Attorney, Agent, or Firm—Oblon, Fisher, Spivak, McClelland, & Maier

[57] ABSTRACT

Compounds useful for dyeing nylon, wool, and leather, having the formula:

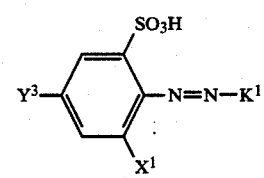

wherein $X^1$ is chlorine, bromine, methyl or trifluoromethyl, $Y^3$ is chlorine or bromine, and $K^1$ is a radical of the formula

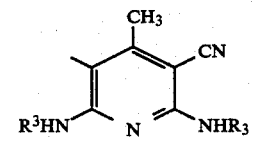

where $R^3$ is $C_2$ to $C_4$ hydroxyalkyl, methoxyethyl or methoxypropyl.

2 Claims, No Drawings

SULFO-CONTAINING HALOPHENYLAZODIAMINO, CYANO PYRIDINE COMPOUNDS

The present invention relates to compounds which, in the form of the free acids, are of the general formula I

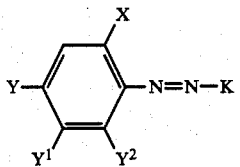

where X is fluorine, chlorine, bromine, methyl, trifluoromethyl, $C_1$–$C_4$-alkylsulfonyl, arylsulfonyl, acetyl or benzoyl, Y is hydrogen, fluorine, chlorine, bromine, sulfamyl, $C_1$–$C_4$-mono- or -dialkylsulfamyl, $C_1$–$C_4$-alkylsulfonyl, methyl or trifluoromethyl, $Y^1$ is hydrogen, hydroxysulfonyl, methyl or chlorine, $Y^2$ is hydrogen or hydroxysulfonyl and K is a radical of the formula

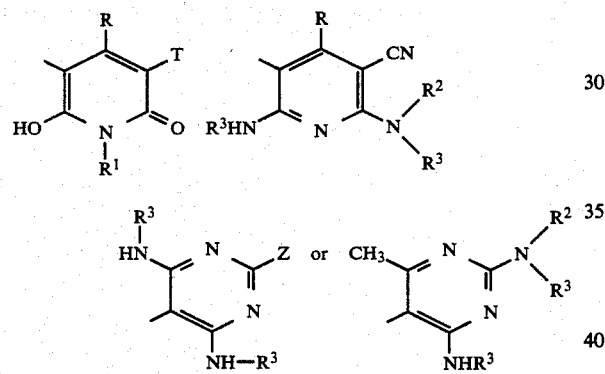

either $Y^1$ or $Y^2$ being hydroxysulfonyl, and T is cyano or methylsulfonyl, R is hydrogen or $C_1$–$C_3$-alkyl, $R^1$ is hydrogen or alkyl or is benzyl, sulfobenzyl, phenylethyl, sulfophenylethyl, sulfophenylpropyl or $C_1$–$C_{10}$-alkyl which is unsubstituted or substituted by hydroxyl, cyano, $C_1$–$C_4$-alkanoyloxy or $C_1$–$C_8$-alkoxy, or is a radical of the formula

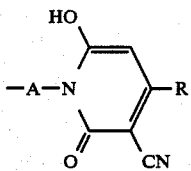

$R^2$ is hydrogen or $C_1$–$C_8$-alkyl, $R^3$ is hydrogen or allyl, or is $C_1$–$C_{10}$-alkyl which may or may not be interrupted by oxygen and is unsubstituted or substituted by hydroxyl, cyano, $C_1$–$C_4$-alkanoyloxy, $C_1$–$C_8$-alkoxy, cyclohexyloxy, phenyl, phenoxy, sulfophenoxy, sulfophenyl or hydroxysulfonyloxy, or is cyclopentyl, or is cyclohexyl which is unsubstituted or substituted by hydroxyl, hydroxyethoxy or methyl, or is pyrrolidonylalkyl, phenyl, methoxyphenyl, sulfophenyl, $C_1$–$C_4$-alkoxysulfophenyl or a radical of the formula

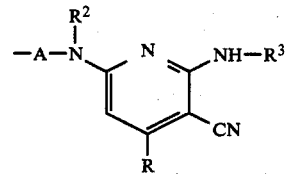

or $R^2$ and $R^3$, together with the nitrogen, form a saturated 5-membered or 6-membered ring, Z is phenyl which is unsubstituted or substituted by chlorine, methyl, methoxy or acetylamino, and A is a $C_2$–$C_{10}$-alkyl radical which may or may not be interrupted by oxygen.

Radicals R are, in addition to hydrogen, ethyl, propyl or, preferably, methyl. In addition to those already mentioned, specific examples of radicals $R^1$, $R^2$ and $R^3$ (where these fall under the general definition) are:

1. Unsubstituted or substituted alkyl radicals:

$CH_3$, $C_2H_5$, n- or i-$C_3H_7$, n- or i-$C_4H_9$, $C_6H_{13}$,

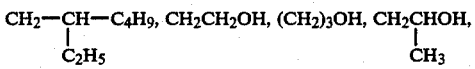

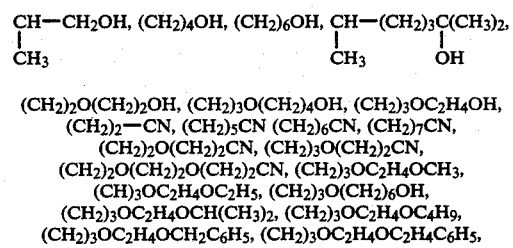

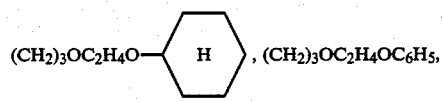

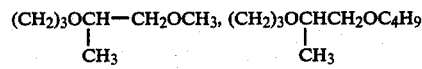

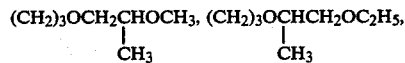

the corresponding radicals in which the groups —$OC_2H_4$—,

—$OCH_2CH(CH_3)$— and —$OCH(CH_3)CH_2$— occur twice, and $CH_2CH_2OCH_3$, $CH_2CH_2O_2H_5$, $CH_2CH_2OC_3H_7$, $CH_2CH_2OC_4H_9$, $CH_2CH_2OC_6H_5$, $(CH_2)_3OCH_3$, $(CH_2)_3OCH_2H_5$, $(CH_2)_3OC_3H_7$, $(CH_2)_3OC_4H_9$, $(CH_2)_3OCH_2CHC_4H_9$, $(CH)_3OC_6H_{13}$,
                                |
                              $C_2H_5$

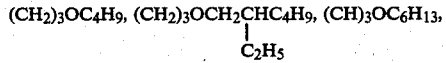

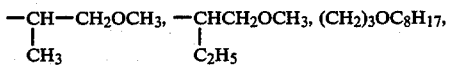

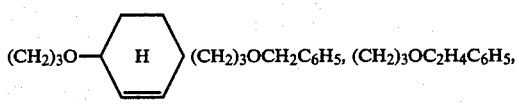

-continued

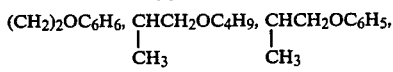

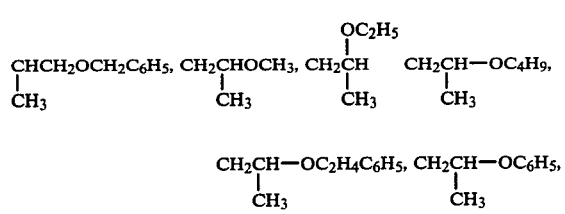

2. unsubstituted or substituted cycloalkyl radicals

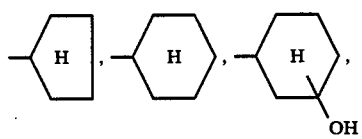

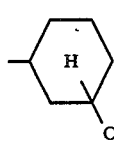

3. Aralkyl radicals:

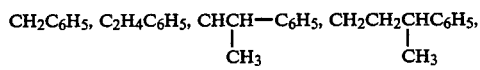

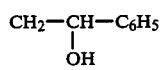

and those containing $C_6H_4CH_3$ instead of $C_6H_5$.

4. Sulfophenyl radicals:

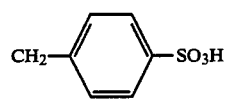

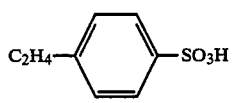

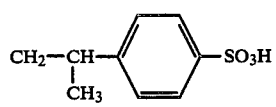

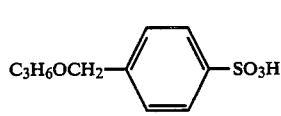

5.

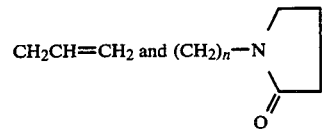

where n is 2, 3, 4 or 6, $C_2H_4OCHO$, $C_2H_4OCOC_2H_5$, $C_2H_4OCOCH_3$, $(C_2H_4O)_2COCH_3$, $(C_2H_4O)_2CHO$, $(CH_2)_3OCOCH_3$, $C_3H_6OCOC_2H_5$ and $(CH_2)_3OCHO$.

Examples of preferred substituents $R^1$ and $R^3$ are:

Hydrogen, $C_2H_5$, n- or i-$C_3H_7$, n- or i-$C_4H_9$, $CH_2CH_2OH$,

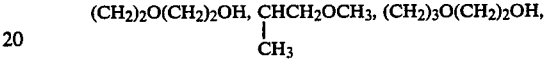

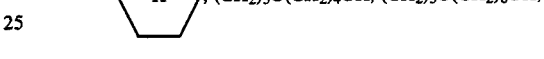

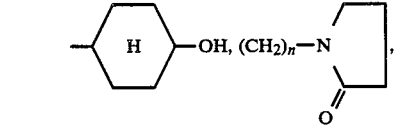

(n = 2, 3, 5), $CH_2CH_2OCH_3$, $CH_2CH_2OC_2H_5$, $CH_2CH_2OC_4H_9$, $(CH_2)_3OCH_3$, $(CH_2)_3OC_2H_5$, $(CH_2)_3OC_3H_7$, $(CH_2)_3OC_4H_9$, $(CH_2)_3OC_2H_4OCH_3$, $(CH_2)_3OC_2H_4OC_4H_9$,

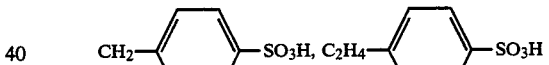

or

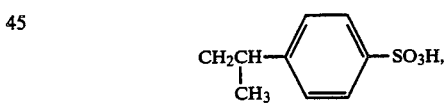

Examples of piperidino or

radicals are pyrrolidino, morpholino.

Specific examples of radicals A are $C_2H_4$, $C_3H_6$, $C_4H_6$, $C_6H_{12}$,

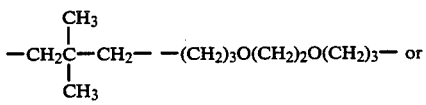

$-(CH_2)_3O(CH_2)_4O(CH_2)_3-$.

Within the scope of the general definitions, specific examples of radicals X and Y, in addition to those stated above, are methyl, ethyl, butyl, phenyl, tolylsulfonyl and the radicals of the formulae SO$_2$NHCH$_3$, SO$_2$NHC$_2$H$_5$, SO$_2$NHC$_3$H$_7$, SO$_2$NHC$_4$H$_9$, SO$_2$N(CH$_3$)$_2$, SO$_2$N(C$_2$H$_5$)$_2$, SO$_2$N(C$_3$H$_7$)$_2$ or SO$_2$N(C$_4$H$_9$)$_2$.

The dyes according to the invention can be prepared by diazotizing a diazo component of an amine of the formula

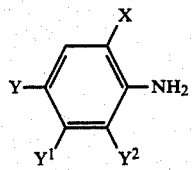

by a conventional method, and reacting the resulting diazonium salt with a coupling component of the formula H—K.

Of particular importance are compounds of formula Ia

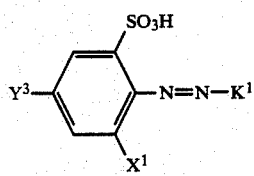

where $X^1$ is chlorine, bromine, methyl or trifluoromethyl, and $K^1$ is a radical of the formula

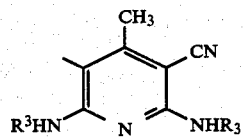

where $R^3$ has the stated meanings.

Other useful compounds are those of the formula Ib

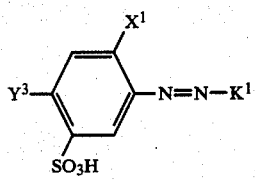

where $K^1$, $X^1$ and $Y^3$ have the meanings given in the case of formula Ia.

Dyes of the formula Ia which possess only one sulfo group are particularly suitable for producing level dyeings on nylon. Because of their fast rate of dyeing, they are particularly suitable for trichromatic dyeing.

The good lightfastness on wool, the advantageous phototropic behavior and the very good levelness are also noteworthy.

Some compounds according to the invention are also useful for dyeing leather.

In the Examples which follow, parts and percentages are by weight, unless stated otherwise.

PREPARATION OF THE INTERMEDIATES

(A) 2,4-Dichloroacetanilide 396 parts by volume of sulfuryl chloride are added to 270 parts of acetanilide in 1000 parts by volume of nitrobenzene in the course of 3 hours at from 50° to 70° C. (the chlorination is begun at a low temperature, which is then increased in order to suppress the precipitation of 2,4-dichloroacetanilide). When the addition of sulfuryl chloride is complete, stirring is continued for 1 hour from 70° to 75° C., after which dissolved hydrogen chloride is blown out with nitrogen. The mixture is then left to cool, whereupon 2,4-dichloroacetanilide is precipitated, and is isolated by being filtered off.

The product can be washed with water and dried to give 330 parts of 2,4-dichloroacetanilide, which contains about 5% of 2,4,6-trichloroacetanilide. If the nitrobenzene which is recovered as a filtrate, and in which some 2,4-dichloroacetanilide is still dissolved, is employed in a second experiment, the yield increases to 396 parts.

(B) 2,4-Dichloroaniline-6-sulfonic acid 204 parts of the crude 2,4-dichloroacetanilide are added to 300 parts of 100% strength sulfuric acid, while stirring. Thereafter, the mixture is heated further to 130° C., and 235 parts of chlorosulfonic acid are added dropwise at this temperature in such a manner that the hydrogen chloride gas liberated can readily be removed. Stirring is then continued at from 135° to 140° C. until the sulfonation is complete, this taking about 1 hour. The mixture is then left to cool to 50°–80° C., and is poured into 1300 parts by volume of water. After steam distillation for a short time, 10 parts of pure 2,4,6-trichloroaniline are obtained, as a by-product, in the distillate. The reaction mixture is then cooled to room temperature, and precipitated 2,4-dichloroaniline-6-sulfonic acid is filtered off and washed with dilute hydrochloric acid. 204 parts of 2,4-dichloroaniline-6-sulfonic acid (calculated as 100% pure) are obtained as a colorless aqueous paste, which can be used in moist form for diazotizations. H-NMR in D$_2$O: 7.3 ppm, 7.6 ppm, J: 3 Hz (as the ammonium salt).

(C) 2,4-Dichloroaniline-5-sulfonic acid 204 parts of crude 2,4-dichloroacetanilide are carefully added to 600 parts of 23% strength oleum, and the mixture is heated to 140° C. and stirred at this temperature for 1 hour. It is then left to cool to 50°–80° C. and is poured into 1000 parts of water. 10 parts of 2,4,6-trichloroaniline are isolated by steam distillation, and the remaining mixture is filtered after it has cooled. The gray product isolated is stirred with about 5000 parts of water and neutralized with sodium hydroxide solution. A little active carbon is added, after which the mixture is heated to about 95° C. and filtered, and the resulting 2,4-dichloroaniline-5-sulfonic acid is precipitated from the filtrate by acidification and is isolated in a conventional manner after the mixture has cooled. The product still contains a small amount of 2,4-dichloroaniline-6-sulfonic acid, which can be removed by recrystallization from water. 2,4-Dichloroaniline-5-sulfonic acid is obtained as a colorless powder. Yield: about 140 parts. H-NMR in D$_2$O: 7.45 ppm (as the ammonium salt).

EXAMPLE 1

19.5 parts of 2,4-dichloroaniline-6-sulfonic acid are dissolved in 200 parts by volume of hot water at pH 7.5–10, using sodium hydroxide solution. A wetting agent which is effective under acidic conditions and 27 parts by volume of a 23% strength aqueous sodium nitrite solution are added, and the mixture is cooled to 0°–5° C. 60 parts of ice are added, after which 55 parts of a 15–18% strength hydrochloric acid solution are introduced all at once, and the mixture is stirred for a further 3 hours at from 0° to 5° C. Thereafter, a solution or suspension of 21.2 parts of 2,6-bis-(3-hydroxypropylamino)-3-cyano-4-methylpyridine in 120 parts by volume of water and 7 parts by volume of concentrated hydrochloric acid is run in, stirring is continued for from 15 to 30 minutes, and the pH of the mixture is then slowly increased to 2–2.5 by adding sodium hydroxide solution or sodium formate. The acid formed as a result of the coupling reaction is then bound continuously by adding appropriate amounts of sodium hydroxide solution or sodium formate. When the reaction has been maintained at pH 2–2.5 for about 30–60 minutes, the pH of the mixture is increased to 3–3.5 by adding dilute sodium hydroxide solution or sodium acetate, and stirring is continued at this pH until the coupling is substantially complete. The pH of the mixture is then increased to 4.3–4.7 by adding dilute sodium hydroxide solution, after which the coupling reaction quickly ends. The resulting dye of the formula

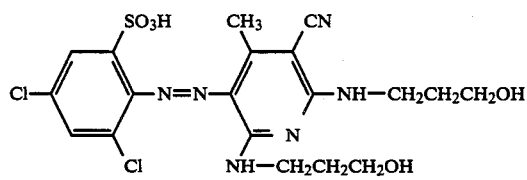

is precipitated virtually quantitatively by adding 80 parts of sodium chloride, and is then isolated by filtration. It is dried to give 42 parts of a reddish brown powder which still contains about 1 part of water-soluble salts in addition to 41 parts of the dye.

The dye dissolves in water to give a yellow solution and dyes nylon and wool in intense, lightfast, golden yellow hues. The absorption maximum of a solution of about 0.020 part of dye in 900 parts by volume of dimethylformamide and 150 parts by volume of glacial acetic acid is 427.5 nm.

The particular advantage of this dye is the high migrating power and the ability to dye nylon simultaneously with red and blue dyes. For example, a dye mixture of about 4 parts of this dye with about 4 parts of Acid Red 57 and 3 parts of Acid Blue 72 gives a (dark) brown. All three dyes dye nylon fabric at the same rate in the temperature range from 60° to 100° C., so that the dyeing always remains brown. The dye is also suitable for combination dyeing to achieve beige hues which are very light-fast and in particular are non-phototropic to light from incandescent lamps (no reversible change to a greener hue).

EXAMPLE 2

19.5 parts of 2,4-dichloroaniline-6-sulfonic acid are diazotized by a procedure similar to that described in Example 1. Excess nitrous acid is then destroyed in a conventional manner, and the diazonium salt mixture is buffered to pH 2–4 with sodium acetate. A solution of 16.7 parts of 1-(2-methoxyethyl)-6-hydroxy-3-cyano-4-methylpyrid-2-one in 200 parts by volume of water, 10 parts of 50% strength sodium hydroxide solution and 0.3 part of a dispersant which is effective under acidic conditions is then run in. The coupling mixture is stirred for a further 60–80 minutes, after which it is acidified to pH 0.3–0.5 with concentrated hydrochloric acid, and the precipitated dye of the formula

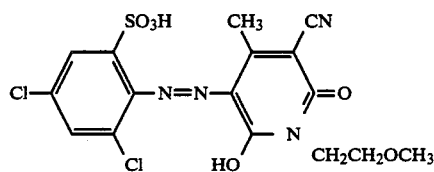

is filtered off under suction, washed salt-free with a little water and dried to give 36 parts of a yellow powder. 20 parts of this powder are suspended in a mixture of 20 parts of butyldiglycol and 60 parts of 2- or 3-methoxypropanol, and the suspension is neutralized with lithium hydroxide. Clear filtration gives a honey yellow solution. This dye solution is very useful for dyeing leather lemon yellow by a conventional spray-dyeing method. The absorption maximum of the dye in a 9:1 dimethylformamide/glacial acetic acid mixture is determined as 412 nm.

EXAMPLE 3

22.1 parts of 2-trifluoromethyl-4-chloroaniline-6-sulfonic acid are diazotized by a procedure similar to that described in Example 1. 31 parts of the coupling component of the formula

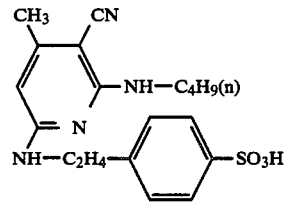

in the form of a roughly 50% strength water-moist paste, are then introduced into the diazonium salt mixture, after which the pH of the coupling mixture is brought to 4.5–5 with 25% strength sodium hydroxide solution. When coupling is complete, the mixture is neutralized with further sodium hydroxide solution and is then spray dried.

73 parts of a red powder are obtained. The resulting dye is of the formula

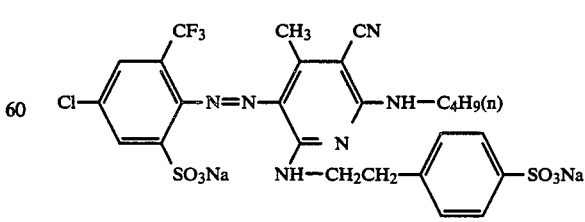

and has an absorption maximum of 430 nm in a 9:1 dimethylformamide/glacial acetic acid mixture. It dyes wool and nylon in fast intense golden yellow hues.

EXAMPLE 4

19.5 parts of 2,4-dichloroaniline-6-sulfonic acid are diazotized by a procedure similar to that described in Example 1. When excess nitrous acid has been destroyed, 24.2 parts of 2-phenyl-4,6-bis-(3-hydroxypropylamino)-pyrimidine are added, and stirring is continued until the coupling component has dissolved. Thereafter, a dispersant which is highly effective at pH 7-10 is added and the pH of the coupling mixture is brought to 8.5-9.2 with sodium hydroxide solution and then with a little sodium carbonate solution (as a buffer). Stirring is continued overnight, and the resulting dye of the formula

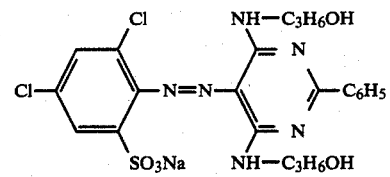

($\lambda$max: 431.5 nm $(CH_3)_2NCHO/CH_3CO_2H=9:1$) is then precipitated by adding about 30 parts of sodium chloride and acidifying the mixture to pH 4-4.5, and is isolated in a conventional manner to give about 50 parts of a reddish brown powder which dissolves in water to give a yellow solution and dyes nylon fabric and wool in very fast golden yellow hues. The dye has great migrating power.

TABLE 1

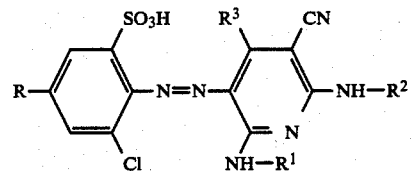

| No. | R | $R^1$ | $R^2$ | $R^3$ | Hue | $\lambda$max (nm) |
|---|---|---|---|---|---|---|
| 1 | Cl | H | $C_3H_6OCH_3$ | $C_3H_7$ | yellow | 413 |
| 2 | Cl | H | $C_3H_6OH$ | $C_3H_7$ | yellow | 413 |
| 3 | Cl | H | $C_3H_6OC_4H_8OH$ | $CH_3$ | yellow | 411 |
| 4 | Cl | H | $C_3H_6OC_4H_8OH$ | H | yellow | 412 |
| 5 | Cl | H | $C_2H_4OC_2H_4OH$ | $CH_3$ | yellow | 409 |
| 6 | Cl | H | $C_2H_4OC_2H_4OCH_3$ | $CH_3$ | yellow | 409 |
| 7 | Cl | H | $C_2H_4OC_4H_9(n)$ | $CH_3$ | yellow | 409 |
| 8 | Cl | H | $C_3H_6OCH_3$ | $CH_3$ | yellow | 410 |
| 9 | Cl | H | $C_3H_6OC_2H_5$ | $CH_3$ | yellow | 410 |
| 10 | Cl | $C_3H_6OC_4H_8OH$ | H | $CH_3$ | yellow | 412 |
| 11 | Cl | $C_3H_6OC_2H_4OC_2H_5$ | H | $CH_3$ | yellow | 411 |
| 12 | Cl | $C_2H_5$ | $C_2H_4OH$ | $CH_3$ | golden yellow | 422 |
| 13 | Cl | $CH_3$ | $C_3H_6OC_4H_8OH$ | $CH_3$ | golden yellow | 420 |
| 14 | Cl | $C_2H_5$ | $C_3H_6OC_4H_8OH$ | $CH_3$ | golden yellow | 422 |
| 15 | Cl | $C_2H_5$ | $C_2H_4OC_2H_4OH$ | $CH_3$ | golden yellow | 421 |
| 16 | Cl | $CH_2CH=CH_2$ | $C_2H_4OC_2H_4OH$ | $CH_3$ | golden yellow | 422 |
| 17 | Cl | $CH(CH_3)_2$ | $C_2H_4OC_2H_4OH$ | $CH_3$ | golden yellow | 420 |
| 18 | Cl | $CH_2CH_2OCH_3$ | $CH_2CH_2OCH_3$ | $CH_3$ | golden yellow | 419 |
| 19 | Cl | $(CH_2)_3OCH_3$ | $CH_2CH_2OCH_3$ | $CH_3$ | golden yellow | 421 |
| 20 | Cl | $(CH_2)_3OCH_3$ | $(CH_2)_3OCH_3$ | $CH_3$ | golden yellow | 427 |
| 21 | Cl | CH—$CH_2OH$<br>\|<br>$CH_3$ | $C_2H_4OCH_3$ | $CH_3$ | golden yellow | 422 |
| 22 | Cl | $CH_2CH_2OCH_3$ | $(CH_2)_3OCH_3$ | $CH_3$ | golden yellow | 423 |
| 23 | Cl | $CH_2CH_2OCH_3$ | $CH_2CH_2OH$ | $CH_3$ | golden yellow | 423 |
| 24 | Cl | $CH_2CH_2OCH_3$ | $CH_2CHCH_3$<br>\|<br>OH | $CH_3$ | golden yellow | 423 |
| 25 | Cl | $CH_2CH_2OCH_3$ | $CH_2CH_2OC_2H_5$ | $CH_3$ | golden yellow | 421 |
| 26 | Cl | $CH_2CH_2OCH_3$ | $(CH_2)_3OCH(CH_3)_2$ | $CH_3$ | golden yellow | 423 |
| 27 | Cl | $CH_2CH_2OCH_3$ | $(CH_2)_3O(CH_2)_4OH$ | $CH_3$ | golden yellow | 423 |
| 28 | Cl | $CH_2CH_2OCH_3$ | $(CH_2)_3OH$ | $CH_3$ | golden yellow | 424 |
| 29 | Cl | $CH_2CH$—$CH_2$<br>\|<br>OH | $CH_2CH_2OCH_3$ | $CH_3$ | golden yellow | 423 |
| 30 | Cl | $CH_2CH$—$CH_3$<br>\|<br>OH | $(CH_2)_3OCH_3$ | $CH_3$ | orange | 423 |
| 31 | Cl | $CH_2CH$—$CH_3$<br>\|<br>OH | $(CH_2)_2OH$ | $CH_3$ | golden yellow | 422 |

TABLE 1-continued

Structure: R-(benzene with SO₃H, Cl)-N=N-(pyridine ring with R³, CN, NH-R², =NH-R¹, N)

| No. | R | R¹ | R² | R³ | Hue | λmax (nm) |
|---|---|---|---|---|---|---|
| 32 | Cl | CH₂CH(OH)CH₃ | (CH₂)₃OH | CH₃ | orange | 424 |
| 33 | Cl | CH₂CH(OH)CH₃ | (CH₂)₃OC₂H₅ | CH₃ | orange | 424 |
| 34 | Cl | CH₂CH(OH)CH₃ | CH₂CH(OH)CH₃ | CH₃ | orange | 424 |
| 35 | Cl | (CH₂)₃OH | (CH₂)₂OH | CH₃ | golden yellow | 425 |
| 36 | Cl | (CH₂)₃OH | CH₂CH(OH)CH₃ | CH₃ | golden yellow | 426 |
| 37 | Cl | (CH₂)₃OH | (CH₂)₂OCH₃ | CH₃ | golden yellow | 426 |
| 38 | Cl | (CH₂)₃OH | (CH₂)₃OCH₃ | CH₃ | golden yellow | 427 |
| 39 | Cl | (CH₂)₃OH | (CH₂)₃OC₂H₅ | CH₃ | golden yellow | 426 |
| 40 | Cl | (CH₂)₂OH | (CH₂)₂OH | CH₃ | golden yellow | 420 |
| 41 | Cl | (CH₂)₂OH | (CH₂)₃OH | CH₃ | golden yellow | 423 |
| 42 | Cl | (CH₂)₂OH | CH₂CH(OH)CH₃ | CH₃ | golden yellow | 423 |
| 43 | Cl | (CH₂)₂OH | (CH₂)₂OCH₃ | CH₃ | golden yellow | 421 |
| 44 | Cl | (CH₂)₂OH | (CH₂)₃OCH₃ | CH₃ | golden yellow | 423 |
| 45 | Cl | (CH₂)₂OH | (CH₂)₃OC₂H₅ | CH₃ | golden yellow | 423 |
| 46 | Cl | (CH₂)₂OH | C₄H₉(n) | CH₃ | golden yellow | 427 |
| 47 | Cl | (CH₂)₂OH | (CH₂)₃OCH₂C₆H₅ | CH₃ | golden yellow | 425 |
| 48 | Cl | (CH₂)₂OH | (CH₂)₂C₆H₅ | CH₃ | golden yellow | 422 |
| 49 | Cl | (CH₂)₂OH | (CH₂)₂-(tetrahydropyran-4-yl) | CH₃ | golden yellow | 422 |
| 50 | Cl | (CH₂)₂OH | (CH₂)₂-N(2-pyrrolidinone) | CH₃ | golden yellow | 423 |
| 51 | Cl | C₂H₅ | (CH₂)₂-N(2-pyrrolidinone) | CH₃ | golden yellow | 422 |
| 52 | Cl | C₂H₅ | C₂H₅ | CH₃ | golden yellow | 420 |
| 53 | Cl | (CH₂)₂CN | (CH₂)₃OH | CH₃ | golden yellow | 422 |
| 54 | Cl | (CH₂)₅CN | (CH₂)₃OH | CH₃ | golden yellow | 423 |
| 55 | Cl | (CH₂)₂C₆H₅ | (CH₂)₂OH | CH₃ | golden yellow | 421 |
| 56 | Cl | (CH₂)₂-C₆H₄-SO₂C₂H₄OH | C₄H₉(n) | CH₃ | golden yellow | 423 |

TABLE 1-continued

[Structure: R-substituted phenyl (with SO₃H and Cl) -N=N- pyridine ring with R³, CN, NH-R², NH-R¹ substituents]

| No. | R | R¹ | R² | R³ | Hue | λmax (nm) |
|---|---|---|---|---|---|---|
| 57 | Cl | CH₂CH=CH₂ | (CH₂)₂OH | CH₃ | golden yellow | 422 |
| 58 | Cl | CH₂CH=CH₂ | (CH₂)₃OH | CH₃ | golden yellow | 423 |
| 59 | Br | (CH₂)₃OH | (CH₂)₃OH | CH₃ | golden yellow | 429 |
| 60 | CF₃ | (CH₂)₃OH | (CH₂)₃OH | CH₃ | golden yellow | 430 |
| 61 | CF₃ | (CH₂)₂OCH₃ | (CH₂)₂OH | CH₃ | golden yellow | 428 |
| 62 | Cl | CH(CH₃)CH₂OCH₃ | (CH₂)₂OH | CH₃ | golden yellow | 425 |
| 63 | Cl | CH(CH₃)CH₂OCH₃ | (CH₂)₃OH | CH₃ | golden yellow | 426 |
| 64 | Cl | CH(C₂H₅)CH₂OCH₃ | (CH₂)₃OH | CH₃ | golden yellow | 426 |
| 65 | Cl | CH(C₂H₅)CH₂OCH₃ | (CH₂)₂OH | CH₃ | golden yellow | 424 |
| 66 | Cl | (CH₂)₂OCOCH₃ | (CH₂)₂OCOCH₃ | CH₃ | golden yellow | 420 |
| 67 | Cl | (CH₂)₃OCHO | (CH₂)₃OCHO | CH₃ | golden yellow | 421 |
| 68 | Cl | (CH₂)₂OCH₃ | (CH₂)₃OCHO | CH₃ | golden yellow | 421 |
| 69 | Cl | (CH₂)₃OCHO | (CH₂)₂OCH₃ | CH₃ | golden yellow | 421 |
| 70 | Cl | (CH₂)₄OH | (CH₂)₄OH | CH₃ | golden yellow | 430 |
| 71 | Cl | (CH₂)₄OH | (CH₂)₃OH | CH₃ | golden yellow | 429 |
| 72 | Cl | (CH₂)₄OH | (CH₂)₂OH | CH₃ | golden yellow | 429 |
| 73 | Cl | (CH₂)₄OH | (CH₂)₂OCH₃ | CH₃ | golden yellow | 428 |

TABLE 2

[Structure: dichlorophenyl-SO₃H -N=N- pyridine with CH₃, CN, NR²R³, NH-R¹ substituents]

| No. | R¹ | R² | R³ | Hue |
|---|---|---|---|---|
| 1 | CH₂CH₂-C₆H₄-SO₃H | C₂H₅ | H | golden yellow |
| 2 | CH₂CH₂-C₆H₄-SO₃H | C₂H₅ | C₂H₅ | orange |
| 3 | CH₂CH₂-C₆H₄-SO₃H | C₄H₉(n) | H | golden yellow |
| 4 | CH₂CH₂-C₆H₄-SO₃H | C₃H₆OCH₃ | H | golden yellow |

TABLE 2-continued

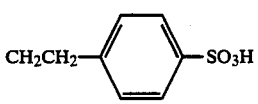

| No. | R¹ | R² | R³ | Hue |
|---|---|---|---|---|
| 5 | CH₂CH₂—⟨C₆H₄⟩—SO₃H | C₂H₄OCH₃ | H | golden yellow |
| 6 | CH₂CH₂—⟨C₆H₄⟩—SO₃H | C₃H₆OC₂H₅ | H | golden yellow |
| 7 | CH₂CH₂—⟨C₆H₄⟩—SO₃H | C₃H₆OH | H | golden yellow |
| 8 | CH₂CH₂—⟨C₆H₄⟩—SO₃H | C₄H₈OH | H | golden yellow |
| 9 | CH₂CH₂—⟨C₆H₄⟩—SO₃H | C₄H₉(n) | C₄H₉(n) | orange |
| 10 | CH₂CH₂—⟨C₆H₄⟩—SO₃H | CH₂—(furyl) | H | golden yellow |
| 11 | CH₂CH(CH₃)—⟨C₆H₄⟩—SO₃H | C₂H₄OH | H | golden yellow |
| 12 | CH₂CH(CH₃)—⟨C₆H₄⟩—SO₃H | C₃H₆OH | H | golden yellow |
| 13 | CH₂CH(CH₃)—⟨C₆H₄⟩—SO₃H | C₄H₉(n) | H | golden yellow |
| 14 | CH₂—⟨C₆H₄⟩—SO₃H | C₃H₆OCH₃ | H | golden yellow |
| 15 | CH₂—⟨C₆H₄⟩—SO₃H | C₂H₄OCH₃ | H | golden yellow |
| 16 | CH₂CH₂—⟨C₆H₄⟩—SO₃H | CH(CH₃)—CH₂OCH₃ | H | golden yellow |

TABLE 2-continued

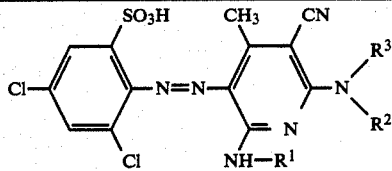

| No. | R¹ | R² | R³ | Hue |
|---|---|---|---|---|
| 17 | $C_4H_8OH$ | CH(CH$_3$)—CH$_2$OCH$_3$ | H | golden yellow |
| 18 | $C_3H_6OH$ | R² and R³: morpholine (O-ring) | | orange |
| 19 | $C_2H_4OCH_3$ | R² and R³: morpholine (O-ring) | | orange |
| 20 | $C_3H_6OCH_3$ | R² and R³: morpholine (O-ring) | | orange |
| 21 | $C_3H_6OH$ | R² and R³: piperidine ring | | orange |

TABLE 3

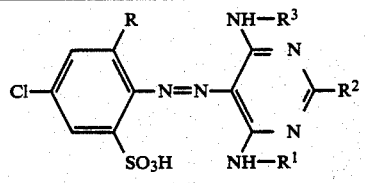

| No. | R | R¹ | R² | R³ | Hue | λmax (nm) |
|---|---|---|---|---|---|---|
| 1 | Cl | $C_3H_6OH$ | $C_6H_5$ | $C_2H_4OH$ | golden yellow | 429 |
| 2 | Cl | $C_3H_6OH$ | $C_6H_5$ | $C_2H_4OCH_3$ | golden yellow | 428 |
| 3 | Cl | $C_3H_6OH$ | $C_6H_5$ | $C_3H_6OCH_3$ | golden yellow | 430 |
| 4 | Cl | $C_3H_6OH$ | $C_6H_5$ | $C_2H_4OC_2H_5$ | golden yellow | 428 |
| 5 | Cl | $C_3H_6OH$ | $C_6H_5$ | $C_2H_4OC_2H_4OH$ | yellow | 427 |
| 6 | Cl | $C_3H_6OH$ | $C_6H_5$ | $C_2H_4OC_2H_4OCH_3$ | yellow | 427 |
| 7 | Cl | $C_3H_6OH$ | $C_6H_5$ | $C_3H_6OC_2H_4OH$ | golden yellow | 430 |
| 8 | Cl | $C_3H_6OH$ | $C_6H_5$ | $C_3H_6OC_4H_8OH$ | golden yellow | 430 |
| 9 | Cl | $C_2H_4OH$ | $C_6H_5$ | $C_2H_4OCH_3$ | yellow | 426 |
| 10 | Cl | $C_2H_4OH$ | $C_6H_5$ | $C_3H_6OCH_3$ | yellow | 427 |
| 11 | Cl | $C_2H_4OH$ | $C_6H_5$ | $C_3H_6OC_3H_7$ | yellow | 428 |
| 12 | Cl | $C_2H_4OCH_3$ | $C_6H_5$ | $C_2H_4OCH_3$ | yellow | 426 |
| 13 | Cl | $C_2H_4OCH_3$ | $C_6H_5$ | $C_3H_6OCH_3$ | yellow | 428 |
| 14 | Cl | $C_3H_6OCH_3$ | $C_6H_5$ | $C_3H_6OCH_3$ | golden yellow | 429 |
| 15 | Cl | CH$_2$—CH(OH)CH$_3$ | $C_6H_5$ | $C_3H_6OCH_3$ | golden yellow | 430 |
| 16 | Cl | CH$_2$—CH(OH)CH$_3$ | $C_6H_5$ | CH$_2$—CH(OH)CH$_3$ | golden yellow | 431 |
| 17 | Br | CH$_2$—CH(OH)CH$_3$ | $C_6H_5$ | CH$_2$—CH(OH)CH$_3$ | golden yellow | 431 |

TABLE 3-continued $$\text{Cl}\underset{\text{SO}_3\text{H}}{\overset{R}{\bigcirc}}-N=N-\underset{NH-R^1}{\overset{NH-R^3}{\bigcirc}}-R^2$$

| No. | R | R¹ | R² | R³ | Hue | λmax (nm) |
|---|---|---|---|---|---|---|
| 18 | Br | C₃H₆OH | C₃H₆ | C₃H₆OH | golden yellow | 432 |
| 19 | Cl | C₃H₆OH | 4-Cl-C₆H₄- | C₃H₆OH | golden yellow | 432 |
| 20 | Cl | C₃H₆OH | 4-CH₃-C₆H₄- | C₃H₆OH | golden yellow | 432 |
| 21 | Cl | C₄H₈OH | C₆H₅ | C₄H₈OH | golden yellow | 433 |
| 22 | Cl | C₂H₄OH | 3-CH₃-C₆H₄- | C₂H₄OH | golden yellow | 431 |
| 23 | Cl | C₂H₄-C₆H₄-SO₃H | 3-CH₃-C₆H₄- | C₂H₄OH | yellow | 428 |
| 24 | CF₃ | C₃H₆OH | —C₆H₆ | C₃H₆OH | golden yellow | 434 |
| 25 | CF₃ | C₃H₆OH | —C₆H₅ | C₂H₄OH | golden yellow | 433 |
| 26 | CF₃ | CH₂—CH(OH)—CH₃ | —C₆H₅ | C₂H₄OH | golden yellow | 433 |
| 27 | CF₃ | CH₂—CH(OH)—CH₃ | —C₆H₅ | CH₂—CH(OH)CH₃ | golden yellow | 435 |
| 28 | CF₃ | C₂H₄OCH₃ | —C₆H₅ | CH₂—CH(OH)CH₃ | golden yellow | 432 |
| 29 | CF₃ | C₂H₄OCH₃ | —C₆H₅ | C₂H₄OH | golden yellow | 432 |
| 30 | CF₃ | C₂H₄OCH₃ | —C₆H₅ | C₃H₆OH | golden yellow | 432 |
| 31 | CF₃ | C₃H₆OCH₃ | —C₆H₅ | C₃H₆OH | golden yellow | 435 |
| 32 | CF₃ | CH₂—C₆H₄—SO₃H | —C₆H₅ | 3-CH₃-C₆H₄- | C₂H₄OH | 433 |
| 33 | Cl | C₂H₄—C₆H₄—SO₃H | —C₆H₅ | CH(CH₃)CH₂OCH₃ | golden yellow | 434 |
| 34 | CH₃ | C₂H₄OH | —C₆H₅ | C₂H₄OH | golden yellow | 432 |

TABLE 4

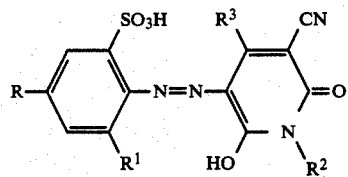

| No. | R | R¹ | R² | R³ | Hue | λmax (nm) |
|---|---|---|---|---|---|---|
| 1 | Cl | Cl | $C_2H_4OH$ | H | greenish yellow | 412 |
| 2 | Cl | Cl | $C_2H_4OH$ | $CH_3$ | greenish yellow | 412 |
| 3 | Cl | Cl | $C_2H_4OH$ | $C_2H_5$ | greenish yellow | 411 |
| 4 | Cl | Cl | $C_2H_4OH$ | $C_3H_7$(n) | greenish yellow | 410 |
| 5 | Cl | Cl | $C_3H_6OH$ | $CH_3$ | greenish yellow | 412 |
| 6 | Cl | Cl | $C_3H_6OH$ | $CH_3$ | greenish yellow | 412 |
| 7 | Cl | Cl | $C_3H_6OH$ | $C_3H_7$(n) | greenish yellow | 411 |
| 8 | Cl | Cl | $C_3H_6OCOCH_3$ | $CH_3$ | greenish yellow | 413 |
| 9 | Cl | Cl | $C_3H_6OCH_3$ | $C_3H_7$(n) | greenish yellow | 412 |
| 10 | Cl | Cl | $C_3H_6OCH_3$ | $CH_3$ | greenish yellow | 412 |
| 11 | Br | Cl | $C_3H_6OCH_3$ | $CH_3$ | greenish yellow | 413 |
| 12 | Cl | Cl | $C_3H_6OCH_3$ | H | greenish yellow | 412 |
| 13 | Cl | Cl | $C_6H_{13}$(n) | $CH_3$ | greenish yellow | 413 |
| 14 | Cl | Cl | $C_3H_6OC_2H_5$ | $CH_3$ | greenish yellow | 413 |
| 15 | Cl | Cl | $C_3H_6OC_3H_7$ | $CH_3$ | greenish yellow | 412 |
| 16 | Cl | Cl | $C_3H_6OC_4H_8OH$ | $CH_3$ | greenish yellow | 412 |
| 17 | Cl | $CF_3$ | $C_3H_6OC_4H_8OH$ | $CH_3$ | greenish yellow | 407 |
| 18 | Cl | $CF_3$ | $C_6H_{12}OH$ | $CH_3$ | greenish yellow | 408 |
| 19 | Cl | Cl | $C_6H_{12}OH$ | $CH_3$ | greenish yellow | 413 |
| 20 | Cl | $CF_3$ | $C_3H_6OCH_3$ | $CH_3$ | greenish yellow | 407 |
| 21 | Cl | $CF_3$ | $CH_2CH_2-C_6H_5$ | $CH_3$ | greenish yellow | 407 |
| 22 | Cl | $CF_3$ | $CH_2CH=CH_2$ | $CH_3$ | greenish yellow | 407 |
| 23 | Cl | $CF_3$ | $C_6H_{13}$(n) | $CH_3$ | greenish yellow | 408 |
| 24 | Cl | $CF_3$ | $CH_2CH_2$-(tetrahydropyran) | $CH_3$ | greenish yellow | 407 |
| 25 | Cl | Cl | $CH_2CH_2$-(tetrahydropyran) | $CH_3$ | greenish yellow | 412 |
| 26 | Cl | Cl | $CH_2CHCH_3$ with OH | $CH_3$ | greenish yellow | 413 |
| 27 | Cl | Cl | $C_4H_8OH$ | $CH_3$ | greenish yellow | 413 |
| 28 | Cl | Cl | $C_6H_{12}OH$ | $CH_3$ | greenish yellow | 413 |
| 29 | H | $SO_2C_6H_5$ | $C_4H_8OH$ | $CH_3$ | greenish yellow | |
| 30 | H | $SO_2C_6H_5$ | $C_3H_6OH$ | $CH_3$ | greenish yellow | |
| 31 | Cl | $CH_3$ | $C_3H_6OH$ | $CH_3$ | greenish yellow | 411 |
| 32 | Cl | $CH_3$ | $C_2H_4OH$ | $CH_3$ | greenish yellow | 412 |
| 33 | Cl | $CH_3$ | $C_3H_6OCH_3$ | $CH_3$ | greenish yellow | 411 |
| 34 | Cl | Br | $C_3H_6OCH_3$ | $CH_3$ | greenish yellow | 413 |
| 35 | Cl | Br | $C_3H_6OH$ | $CH_3$ | greenish yellow | 413 |
| 36 | Cl | Br | $C_4H_8OH$ | $CH_3$ | greenish yellow | 413 |
| 37 | $CH_3$ | Br | $C_4H_8OH$ | $CH_3$ | greenish yellow | 414 |
| 38 | $CH_3$ | Br | $C_3H_6OH$ | $CH_3$ | greenish yellow | 414 |
| 39 | $CH_3$ | Br | $C_3H_6OCH_3$ | $CH_3$ | greenish yellow | 414 |
| 40 | $CH_3$ | Br | $C_2H_4OCH_3$ | $CH_3$ | greenish yellow | 414 |

TABLE 5

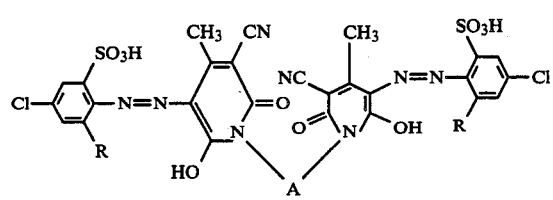

| No. | R | A | Hue | λmax (nm) |
|---|---|---|---|---|
| 1 | Cl | $-C_2H_4-$ | greenish yellow | 413 |
| 2 | Cl | $-C_3H_6-$ | greenish yellow | 413 |
| 3 | Cl | $-CH_2-CH(CH_3)-$ | greenish yellow | 413 |
| 4 | Cl | $-(CH_2)_6-$ | greenish yellow | 412 |
| 5 | Cl | $-(CH_2)_3O(CH_2)_3-$ | greenish yellow | 413 |
| 6 | Br | $-(CH_2)_3O(CH_2)_2O(CH_2)_3-$ | greenish yellow | 413 |
| 7 | Br | $-C_3H_6-$ | greenish yellow | 413 |
| 8 | $CF_3$ | $-C_2H_4-$ | greenish yellow | 417 |
| 9 | $CF_3$ | $-C_3H_6-$ | greenish yellow | 408 |
| 10 | $CF_3$ | $-CH_2-CH(CH_3)-$ | greenish yellow | 408 |
| 11 | $CF_3$ | $-(CH_2)_6-$ | greenish yellow | 408 |
| 12 | $CF_3$ | $-(CH_2)_3O(CH_2)_3-$ | greenish yellow | 408 |
| 13 | Cl | $-(CH_2)_3O(CH_2)_2O(CH_2)_3-$ | greenish yellow | 412 |
| 14 | Cl | $-(CH_2)_3O(CH_2)_4O(CH_2)_3$ | greenish yellow | 413 |
| 15 | Cl | $-CH_2-(CH_3)_2-CH_2-$ | greenish yellow | 413 |

TABLE 6

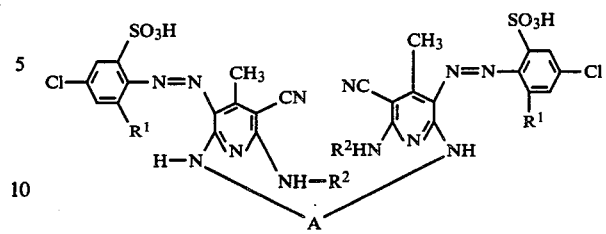

| No. | A | $R^1$ | $R^2$ | Hue |
|---|---|---|---|---|
| 1 | $-CH_2CH_2-$ | Cl | $C_2H_4OH$ | golden yellow |
| 2 | $-(CH_2)_3-$ | Cl | $C_2H_4OH$ | golden yellow |
| 3 | $-(CH_2)_3-$ | Cl | $C_3H_6OH$ | golden yellow |
| 4 | $-(CH_2)_3-$ | Cl | $C_2H_4OC_2H_4OH$ | golden yellow |
| 5 | $-(CH_2)_3-$ | Cl | $C_2H_4OCH_3$ | golden yellow |
| 6 | $-(CH_2)_3-$ | Cl | $C_3H_6OCH_3$ | golden yellow |
| 7 | $-(CH_2)_4-$ | Cl | $C_2H_4OH$ | golden yellow |
| 8 | $-(CH_2)_4-$ | Cl | $C_3H_6OH$ | golden yellow |
| 9 | $-(CH_2)_3O(CH_2)_2O(CH_2)_3$ | Cl | $C_2H_4OH$ | golden yellow |
| 10 | $-(CH_2)_3O(CH_2)_2O(CH_2)_3$ | Cl | $C_3H_6OH$ | golden yellow |
| 11 | $-(CH_2)_3O(CH_2)_4O(CH_2)_3$ | Cl | $C_3H_6OH$ | golden yellow |
| 12 | $-(CH_2)_3O(CH_2)_4O(CH_2)_3$ | Cl | $C_2H_4OCH_3$ | golden yellow |
| 13 | $-(CH_2)_3O(CH_2)_4O(CH_2)_3$ | Cl | $C_3H_6OCH_3$ | golden yellow |
| 14 | $-(CH_2)_3O(CH_2)_4O(CH_2)_3$ | $CF_3$ | $C_3H_6OCH_3$ | golden yellow |
| 15 | $-(CH_2)_3-$ | $CF_3$ | $C_3H_6OCH_3$ | golden yellow |
| 16 | $-(CH_2)_6-$ | Cl | $C_2H_4OCH_3$ | golden yellow |
| 17 | $-CH_2-CH(CH_3)-$ | Cl | $C_2H_4OH$ | golden yellow |
| 18 | $-CH_2-CH(CH_3)-$ | Cl | $C_2H_4OC_2H_4OH$ | golden yellow |
| 19 | $-(CH_2)_3-$ | Cl | $C_2H_4OC_2H_4OH$ | golden yellow |
| 20 | $-(CH_2)_3-$ | Cl | $C_4H_8OH$ | golden yellow |
| 21 | $-(CH_2)_3-$ | $CH_3$ | $C_2H_4OH$ | golden yellow |

TABLE 7

[Structure: benzene ring with SO₃H, R, R¹, R² substituents and N=N—K azo group]

| No. | R | R¹ | R² | K | Hue | λmax (nm) |
|---|---|---|---|---|---|---|
| 1 | H | H | SO₂C₆H₅ | [pyridine: CH₃, CN, NH—C₄H₈OH, NH—C₄H₈OH] | orange | |
| 2 | CH₃ | H | SO₂C₆H₅ | | orange | |
| 3 | Cl | Cl | Cl | | orange | |
| 4 | H | Cl | SO₂C₆H₅ | [pyridine: CH₃, CN, NH—C₃H₆OCH₃, NH—C₃H₆OCH₃] | orange | |
| 5 | CH₃ | Cl | SO₂C₆H₅ | | orange | |
| 6 | Cl | Cl | Cl | [pyridine: CN, CH₃, NH—C₃H₆OH, NH—C₃H₆OH] | orange | |
| 7 | Cl | H | SO₂C₆H₅ | | orange | |
| 8 | H | H | COCH₃ | [pyridine: CN, CH₃, NH—C₃H₆OH, NH—C₃H₆OH] | orange | |
| 9 | H | H | CF₃ | | orange | |
| 10 | H | H | COC₆H₅ | | orange | |
| 11 | H | H | COC₆H₅ | [pyridine: CN, CH₃, NH—C₃H₆OCH₃, NH—C₃H₆OCH₃] | orange | |
| 12 | H | H | COCH₃ | | orange | |
| 13 | F | H | Br | | orange | |
| 14 | Br | H | F | [pyridine: CN, CH₃, NH—C₃H₆OH, NH—C₃H₆OH] | orange | |
| 15 | Cl | H | F | | orange | |
| 16 | H | Cl | Cl | [pyridine: CN, CH₃, NH—CH₂—CH(OH)CH₃, NH—CH₂—CH(OH)CH₃] | orange | 425 |
| 17 | Cl | H | SO₂C₄H₉ | | orange | |
| 18 | SO₂C₄H₉ | H | Cl | | orange | |
| 19 | Cl | Cl | Cl | | orange | |

TABLE 7-continued

Structure:

R, R¹, R² substituted benzene with SO₃H and N=N-K group

| No. | R | R¹ | R² | K | Hue | λmax (nm) |
|---|---|---|---|---|---|---|
| 20 | Cl | Cl | Cl | NH—C₃H₆OH, N, C₆H₅, N, NH—C₃H₆OH (pyridine) | orange | 425 |
| 21 | Cl | H | CH₃ | | orange | |

TABLE 8

Structure: dichlorobenzene with SO₃H, N=N coupled to methylpyridine with CN, CH₃, NH—R¹, NR²H

| No. | R¹ | R² | λmax (nm) |
|---|---|---|---|
| 1 | CH₂CH₂—C₆H₄—SO₃H | C₆H₅ | 432 |
| 2 | CH₂CH₂—C₆H₄—SO₃H | —C₆H₄—CH₃ | 433 |
| 3 | CH₂CH₂—C₆H₄—SO₃H | —C₆H₄(CH₃) (meta) | 432 |
| 4 | CH₂CH₂—C₆H₄—SO₃H | —C₆H₄—OCH₃ | 435 |
| 5 | CH₂CH₂—C₆H₄—SO₃H | —C₆H₄(OCH₃) (ortho) | 435 |
| 6 | CH₂CH₂—C₆H₄—SO₃H | —C₆H₄(OCH₃) (meta) | 434 |
| 7 | CH₂—C₆H₄—SO₃H | C₆H₅ | 430 |
| 8 | CH₂—C₆H₄—SO₃H | —C₆H₄(OCH₃) (ortho) | 432 |
| 9 | CH₂—C₆H₄—SO₃H | —C₆H₄(CH₃) (meta) | 430 |
| 10 | CH₂—C₆H₄—SO₃H | —C₆H₄—CH₃ | 430 |
| 11 | CH₂CH(CH₃)—C₆H₄—SO₃H | C₆H₅ | 430 |
| 12 | CH₂CH(CH₃)—C₆H₄—SO₃H | —C₆H₄(OCH₃) (ortho) | 435 |
| 13 | CH₂CH(CH₃)—C₆H₄—SO₃H | —C₆H₄(CH₃) (meta) | 431 |

EXAMPLE 5

19.5 parts of 2,4-dichloroaniline-5-sulfonic acid are stirred overnight with 50 parts of 15% strength hydrochloric acid in the presence of a wetting agent which is effective under acidic conditions. Thereafter, the mixture is cooled with ice to 0° C., 27 parts by volume of a 23% strength sodium nitrite solution are added in the course of from 5 to 20 minutes, and the suspension is stirred for a further 3 hours at from 0° to 5° C. A solution or suspension of 21.2 parts of 2,6-bis-(3-hydroxypropylamino)-3-cyano-4-methylpyridine in 120 parts by volume of water and 7 parts by volume of concentrated hydrochloric acid is then run in. Stirring is continued for from 15 to 30 minutes, and the pH of the mixture is then slowly increased to 1-1.5 by adding sodium hydroxide solution or sodium formate. The acid formed as a result of the coupling reaction is then bound continuously by adding appropriate amounts of sodium hydroxide solution or sodium formate. When the mixture has been kept at pH 1-1.5 for about 30-60 minutes, the pH is increased to 3-3.5 by adding dilute sodium hydroxide solution or sodium acetate. The coupling reaction quickly comes to an end. The resulting dye of the formula

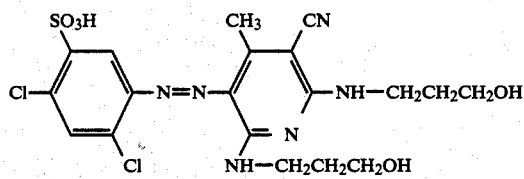

is precipitated virtually quantitatively by adding 40 parts of sodium chloride and is then isolated by filtration. After drying, 44 parts of a brown powder are obtained.

The dye dissolves in water to give a yellow solution and dyes nylon and wool in intense, lightfast, golden yellow hues.

The absorption maximum of a solution of about 0.020 part of the dye in 900 parts by volume of dimethylformamide and 150 parts by volume of glacial acetic acid is 457 nm (water: 435 nm).

TABLE 9

| No. | $R^1$ | $R^2$ | λmax (nm) |
|---|---|---|---|
| 1 | CH₂CH₂—⟨C₆H₄⟩—SO₃H | C₆H₅ | 459 |
| 2 | CH₂CH₂—⟨C₆H₄⟩—SO₃H | —⟨C₆H₄⟩—CH₃ (p) | 459 |
| 3 | CH₂CH₂—⟨C₆H₄⟩—SO₃H | —⟨C₆H₄⟩—CH₃ (m) | 459 |
| 4 | CH₂CH₂—⟨C₆H₄⟩—SO₃H | —⟨C₆H₄⟩—OCH₃ (p) | 460 |

TABLE 9-continued

| No. | $R^1$ | $R^2$ | λmax (nm) |
|---|---|---|---|
| 5 | CH₂CH₂—⟨C₆H₄⟩—SO₃H | —⟨C₆H₄⟩—OCH₃ (o) | 460 |
| 6 | CH₂CH₂—⟨C₆H₄⟩—SO₃H | —⟨C₆H₄⟩—OCH₃ (m) | 460 |
| 7 | CH₂—⟨C₆H₄⟩—SO₃H | C₆H₅ | 456 |
| 8 | CH₂—⟨C₆H₄⟩—SO₃H | —⟨C₆H₄⟩—OCH₃ (o) | 459 |
| 9 | CH₂—⟨C₆H₄⟩—SO₃H | —⟨C₆H₄⟩—CH₃ (m) | 457 |
| 10 | CH₂—⟨C₆H₄⟩—SO₃H | —⟨C₆H₄⟩—CH₃ (p) | 457 |
| 11 | CH₂CH(CH₃)—⟨C₆H₄⟩—SO₃H | C₆H₅ | 458 |
| 12 | CH₂CH(CH₃)—⟨C₆H₄⟩—SO₃H | —⟨C₆H₄⟩—OCH₃ (o) | 460 |
| 13 | CH₂CH(CH₃)—⟨C₆H₄⟩—SO₃H | —⟨C₆H₄⟩—CH₃ (m) | 458 |

TABLE 10

| No. | R | $R^1$ | $R^2$ | $R^3$ | Hue | λmax (nm) |
|---|---|---|---|---|---|---|
| 1 | Cl | H | C₃H₆OCH₃ | C₃H₇ | yellow | 446 |
| 2 | Cl | H | C₃H₆OH | C₃H₇ | yellow | 446 |
| 3 | Cl | H | C₃H₆OC₄H₈OH | CH₃ | yellow | 441 |
| 4 | Cl | H | C₃H₆OC₄H₈OH | H | yellow | 443 |
| 5 | Cl | H | C₂H₄OC₂H₄OH | CH₃ | yellow | 443 |
| 6 | Cl | H | C₂H₄OC₂H₄OCH₃ | CH₃ | yellow | 444 |
| 7 | Cl | H | C₂H₄OC₄H₉(n) | CH₃ | yellow | 446 |
| 8 | Cl | H | C₃H₆OCH₃ | CH₃ | yellow | 446 |
| 9 | Cl | H | C₃H₆OC₂H₅ | CH₃ | yellow | 446 |
| 10 | Cl | C₃H₆OC₄H₈OH | H | CH₃ | yellow | 448 |
| 11 | Cl | C₃H₆OC₂H₄OC₂H₅ | H | CH₃ | yellow | 449 |

TABLE 10-continued

Structure:
- Benzene ring with SO$_3$H (top), R (left), Cl (bottom), connected via N=N to pyridine ring with R$^3$, CN, NH—R$^2$, and NH—R$^1$ substituents.

| No. | R | R$^1$ | R$^2$ | R$^3$ | Hue | λmax (nm) |
|---|---|---|---|---|---|---|
| 12 | Cl | C$_2$H$_5$ | C$_2$H$_4$OH | CH$_3$ | golden yellow | 455 |
| 13 | Cl | CH$_3$ | C$_3$H$_6$OC$_4$H$_8$OH | CH$_3$ | golden yellow | 454 |
| 14 | Cl | C$_2$H$_5$ | C$_3$H$_6$OC$_4$H$_8$OH | CH$_3$ | golden yellow | 455 |
| 15 | Cl | C$_2$H$_5$ | C$_2$H$_4$OC$_2$H$_4$OH | CH$_3$ | golden yellow | 453 |
| 16 | Cl | CH$_2$CH=CH$_2$ | C$_2$H$_4$OC$_2$H$_4$OH | CH$_3$ | golden yellow | 454 |
| 17 | Cl | CH(CH$_3$)$_2$ | C$_2$H$_4$OC$_2$H$_4$OH | CH$_3$ | golden yellow | 453 |
| 18 | Cl | CH$_2$CH$_2$OCH$_3$ | CH$_2$CH$_2$OCH$_3$ | CH$_3$ | golden yellow | 454 |
| 19 | Cl | (CH$_2$)$_3$OCH$_3$ | CH$_2$CH$_2$OCH$_3$ | CH$_3$ | golden yellow | 455 |
| 20 | Cl | (CH$_2$)$_3$OCH$_3$ | (CH$_2$)$_3$OCH$_3$ | CH$_3$ | golden yellow | 456 |
| 21 | Cl | CH(CH$_3$)—CH$_2$OH | C$_2$H$_4$OCH$_3$ | CH$_3$ | golden yellow | 455 |
| 22 | Cl | CH$_2$CH$_2$OCH$_3$ | (CH$_2$)$_3$OCH$_3$ | CH$_3$ | golden yellow | 455 |
| 23 | Cl | CH$_2$CH$_2$OCH$_3$ | CH$_2$CH$_2$OH | CH$_3$ | golden yellow | 453 |
| 24 | Cl | CH$_2$CH$_2$OCH$_3$ | CH$_2$CH(OH)CH$_3$ | CH$_3$ | golden yellow | 453 |
| 25 | Cl | CH$_2$CH$_2$OCH$_3$ | CH$_2$CH$_2$OC$_2$H$_5$ | CH$_3$ | golden yellow | 452 |
| 26 | Cl | CH$_2$CH$_2$OCH$_3$ | (CH$_2$)$_3$OCH(CH$_3$)$_2$ | CH$_3$ | golden yellow | 454 |
| 27 | Cl | CH$_2$CH$_2$OCH$_3$ | (CH$_2$)$_3$O(CH$_2$)$_4$OH | CH$_3$ | golden yellow | 454 |
| 28 | Cl | CH$_2$CH$_2$OCH$_3$ | (CH$_2$)$_3$OH | CH$_3$ | golden yellow | 454 |
| 29 | Cl | CH$_2$CH(OH)—CH$_3$ | CH$_2$CH$_2$OCH$_3$ | CH$_3$ | golden yellow | 452 |
| 30 | Cl | CH$_2$CH(OH)—CH$_3$ | (CH$_2$)$_3$OCH$_3$ | CH$_3$ | orange | 453 |
| 31 | Cl | CH$_2$CH(OH)—CH$_3$ | (CH$_2$)$_2$OH | CH$_3$ | golden yellow | 452 |
| 32 | Cl | CH$_2$CH(OH)—CH$_3$ | (CH$_2$)$_3$OH | CH$_3$ | orange | 453 |
| 33 | Cl | CH$_2$CH(OH)—CH$_3$ | (CH$_2$)$_3$OC$_2$H$_5$ | CH$_3$ | orange | 453 |
| 34 | Cl | CH$_2$CH(OH)—CH$_3$ | CH$_2$CH(OH)CH$_3$ | CH$_3$ | orange | 453 |
| 35 | Cl | (CH$_2$)$_3$OH | (CH$_2$)$_2$OH | CH$_3$ | golden yellow | 452 |
| 36 | Cl | (CH$_2$)$_3$OH | CH$_2$CH(OH)CH$_3$ | CH$_3$ | golden yellow | 455 |
| 37 | Cl | (CH$_2$)$_3$OH | (CH$_2$)$_2$OCH$_3$ | CH$_3$ | golden yellow | 453 |
| 38 | Cl | (CH$_2$)$_3$OH | (CH$_2$)$_3$OCH$_3$ | CH$_3$ | golden yellow | 456 |
| 39 | Cl | (CH$_2$)$_3$OH | (CH$_2$)$_3$OC$_2$H$_5$ | CH$_3$ | golden yellow | 456 |
| 40 | Cl | (CH$_2$)$_2$OH | (CH$_2$)$_2$OH | CH$_3$ | golden yellow | 452 |
| 41 | Cl | (CH$_2$)$_2$OH | (CH$_2$)$_3$OH | CH$_3$ | golden yellow | 453 |
| 42 | Cl | (CH$_2$)$_2$OH | CH$_2$CH(OH)CH$_3$ | CH$_3$ | golden yellow | 453 |
| 43 | Cl | (CH$_2$)$_2$OH | (CH$_2$)$_2$OCH$_3$ | CH$_3$ | golden yellow | 451 |
| 44 | Cl | (CH$_2$)$_2$OH | (CH$_2$)$_2$OCH$_3$ | CH$_3$ | golden yellow | 453 |
| 45 | Cl | (CH$_2$)$_2$OH | (CH$_2$)$_3$OC$_2$H$_5$ | CH$_3$ | golden yellow | 453 |
| 46 | Cl | (CH$_2$)$_2$OH | C$_4$H$_9$(n) | CH$_3$ | golden yellow | 456 |
| 47 | Cl | (CH$_2$)$_2$OH | (CH$_2$)$_3$OCH$_2$C$_6$H$_5$ | CH$_3$ | golden yellow | 455 |
| 48 | Cl | (CH$_2$)$_2$OH | (CH$_2$)$_2$C$_6$H$_5$ | CH$_3$ | golden yellow | 450 |

TABLE 10-continued

Structure:
- Benzene ring with SO₃H, R (para to Cl), Cl, and N=N linkage
- Pyridine ring with R³, CN, NH-R², NH-R¹ substituents

| No. | R | R¹ | R² | R³ | Hue | λmax (nm) |
|---|---|---|---|---|---|---|
| 49 | Cl | (CH₂)₂OH | (CH₂)₂-[tetrahydropyran-4-yl] | CH₃ | golden yellow | 455 |
| 50 | Cl | (CH₂)₂OH | (CH₂)₂N-[2-pyrrolidinone] | CH₃ | golden yellow | 454 |
| 51 | Cl | C₂H₅ | (CH₂)₂N-[2-pyrrolidinone] | CH₃ | golden yellow | 451 |
| 52 | Cl | C₂H₅ | C₂H₅ | CH₃ | golden yellow | 449 |
| 53 | Cl | (CH₂)₂CN | (CH₂)₃OH | CH₃ | golden yellow | 450 |
| 54 | Cl | (CH₂)₅CN | (CH₂)₃OH | CH₃ | golden yellow | 457 |
| 55 | Cl | (CH₂)₂C₆H₅ | (CH₂)₂OH | CH₃ | golden yellow | 448 |
| 56 | Cl | (CH₂)₂-C₆H₄-SO₂C₂H₄OH | C₄H₉(n) | CH₃ | golden yellow | 450 |
| 57 | Cl | CH₂CH=CH₂ | (CH₂)₂OH | CH₃ | golden yellow | 452 |
| 58 | Cl | CH₂CH=CH₂ | (CH₂)₃OH | CH₃ | golden yellow | 454 |
| 59 | Br | (CH₂)₃OH | (CH₂)₃OH | CH₃ | golden yellow | 457 |
| 60 | CF₃ | (CH₂)₃OH | (CH₂)₃OH | CH₃ | golden yellow | 458 |
| 61 | CF₃ | (CH₂)₂OCH₃ | (CH₂)₂OH | CH₃ | golden yellow | 456 |
| 62 | Cl | CHCH₂OCH₃ \| CH₃ | (CH₂)₂OH | CH₃ | golden yellow | 453 |
| 63 | Cl | CHCH₂OCH₃ \| CH₃ | (CH₂)₃OH | CH₃ | golden yellow | 454 |
| 64 | Cl | CHCH₂OCH₃ \| C₂H₅ | (CH₂)₃OH | CH₃ | golden yellow | 455 |
| 65 | Cl | CHCH₂OCH₃ \| C₂H₅ | (CH₂)₂OH | CH₃ | golden yellow | 454 |
| 66 | Cl | (CH₂)₂OCOCH₃ | (CH₂)₂OCOCH₃ | CH₃ | golden yellow | 450 |
| 67 | Cl | (CH₂)₃OCHO | (CH₂)₃OCHO | CH₃ | golden yellow | 454 |
| 68 | Cl | (CH₂)₂OCH₃ | (CH₂)₃OCHO | CH₃ | golden yellow | 453 |
| 69 | Cl | (CH₂)₃OCHO | (CH₂)₂OCH₃ | CH₃ | golden yellow | 453 |
| 70 | Cl | (CH₂)₄OH | (CH₂)₄OH | CH₃ | golden yellow | 457 |
| 71 | Cl | (CH₂)₄OH | (CH₂)₃OH | CH₃ | golden yellow | 457 |
| 72 | Cl | (CH₂)₄OH | (CH₂)₂OH | CH₃ | golden yellow | 456 |
| 73 | Cl | (CH₂)₄OH | (CH₂)₂OCH₃ | CH₃ | golden yellow | 456 |

TABLE 10-continued

[Structure: sulfonated chlorophenyl azo pyridine with R, SO₃H, R³, CN, NH-R², NH-R¹, Cl substituents]

| No. | R  | R¹              | R²                              | R³  | Hue    | λmax (nm) |
|-----|----|-----------------|---------------------------------|-----|--------|-----------|
| 74  | Cl | C₃H₆OC₂H₄OCH₃   | 2-methoxyphenyl                 | CH₃ | orange | 459       |
| 75  | Cl | C₃H₆OC₂H₄OCH₃   | —C₆H₅                           | CH₃ | orange | 458       |
| 76  | Cl | C₃H₅(OC₂H₄)₂OCH₃| C₆H₅                            | CH₃ | orange | 458       |
| 77  | Cl | C₃H₆(OC₂H₄)₂OCH₃| 2-methoxyphenyl                 | CH₃ | orange | 460       |
| 78  | Cl | C₂H₄OC₂H₄OH     | 2-methoxyphenyl                 | CH₃ | orange | 458       |
| 79  | Cl | C₂H₄OC₂H₄OH     | —C₆H₅                           | CH₃ | orange | 457       |
| 80  | Cl | —C₆H₅           | C₂H₄OC₂H₄OH                     | CH₃ | orange | 456       |
| 81  | Cl | 4-methoxyphenyl | C₂H₄OC₂H₄OH                     | CH₃ | orange | 458       |
| 82  | Cl | 3-methoxyphenyl | C₂H₄OC₂H₄OH                     | CH₃ | orange | 458       |
| 83  | Cl | 2-methyl-4-methoxyphenyl | C₂H₄OC₂H₄OH            | CH₃ | orange | 458       |

TABLE 11

[Structure: chlorophenyl sulfonic azo pyridine with R, NH-R³, R², NH-R¹ substituents]

| No. | R  | R¹       | R²    | R³        | Hue           | λmax (nm) |
|-----|----|----------|-------|-----------|---------------|-----------|
| 1   | Cl | C₃H₆OH   | C₆H₅  | C₂H₄OH    | golden yellow | 435       |
| 2   | Cl | C₃H₆OH   | C₆H₅  | C₂H₄OCH₃  | golden yellow | 433       |
| 3   | Cl | C₃H₆OH   | C₆H₅  | C₃H₆OCH₃  | golden yellow | 436       |
| 4   | Cl | C₃H₆OH   | C₆H₅  | C₂H₄OC₂H₅ | golden yellow | 434       |

TABLE 11-continued

Structure: 4-chloro-phenyl with R substituent, SO3H, connected via N=N to a pyrimidine ring bearing NH-R³, NH-R¹, and R² substituents.

| No. | R | R¹ | R² | R³ | Hue | λmax (nm) |
|---|---|---|---|---|---|---|
| 5 | Cl | C₃H₆OH | C₆H₅ | C₂H₄OC₂H₄OH | yellow | 433 |
| 6 | Cl | C₃H₆OH | C₆H₅ | C₂H₄OC₂H₄OCH₃ | yellow | 433 |
| 7 | Cl | C₃H₆OH | C₆H₅ | C₃H₆OC₂H₄OH | golden yellow | 435 |
| 8 | Cl | C₃H₆OH | C₆H₅ | C₃H₆OC₄H₈OH | golden yellow | 436 |
| 9 | Cl | C₂H₄OH | C₆H₅ | C₂H₄OCH₃ | yellow | 431 |
| 10 | Cl | C₂H₄OH | C₆H₅ | C₃H₆OCH₃ | yellow | 432 |
| 11 | Cl | C₂H₄OH | C₆H₅ | C₃H₆OC₃H₇ | yellow | 433 |
| 12 | Cl | C₂H₄OCH₃ | C₆H₅ | C₂H₄OCH₃ | yellow | 431 |
| 13 | Cl | C₂H₄OCH₃ | C₆H₅ | C₃H₆OCH₃ | yellow | 433 |
| 14 | Cl | C₃H₆OCH₃ | C₆H₅ | C₃H₆OCH₃ | golden yellow | 434 |
| 15 | Cl | CH₂—CH(OH)CH₃ | C₆H₅ | C₃H₄OCH₃ | golden yellow | 435 |
| 16 | Cl | CH₂—CH(OH)CH₃ | C₆H₅ | CH₂—CH(OH)CH₃ | golden yellow | 436 |
| 17 | Br | CH₂—CH(OH)CH₃ | C₆H₅ | CH₂—CH(OH)CH₃ | golden yellow | 436 |
| 18 | Br | C₃H₆OH | C₆H₆ | C₃H₆OH | golden yellow | 437 |
| 19 | Cl | C₃H₆OH | 4-Cl-C₆H₄— | C₃H₆OH | golden yellow | 436 |
| 20 | Cl | C₃H₆OH | 4-CH₃-C₆H₄— | C₃H₆OH | golden yellow | 437 |
| 21 | Cl | C₄H₈OH | C₆H₅ | C₄H₈OH | golden yellow | 438 |
| 22 | Cl | C₂H₄OH | 3-CH₃-C₆H₄— | C₂H₄OH | golden yellow | 436 |
| 23 | Cl | C₂H₄-C₆H₄-SO₃H | 3-CH₃-C₆H₄— | C₂H₄OH | yellow | 434 |
| 24 | CF₃ | C₃H₆OH | —C₆H₅ | C₃H₆OH | golden yellow | 439 |
| 25 | CF₃ | C₃H₆OH | —C₆H₅ | C₂H₄OH | golden yellow | 439 |
| 26 | CF₃ | CH₂—CH(OH)—CH₃ | —C₆H₅ | C₂H₄OH | golden yellow | 439 |

TABLE 12

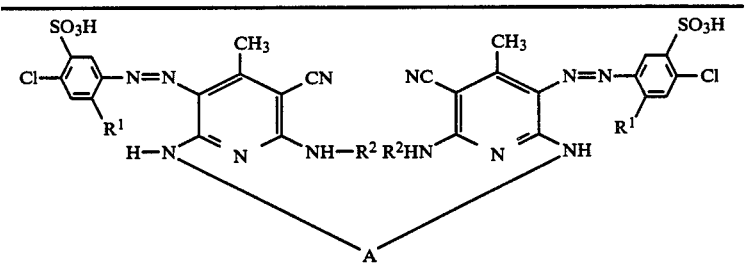

| No. | A | R¹ | R² | Hue | λmax (nm) |
|---|---|---|---|---|---|
| 1 | $-CH_2CH_2-$ | Cl | $C_2H_4OH$ | golden yellow | 451 |
| 2 | $-(CH_2)_3-$ | Cl | $C_2H_4OH$ | golden yellow | 453 |
| 3 | $-(CH_2)_3-$ | Br | $C_3H_6OH$ | golden yellow | 455 |
| 4 | $-(CH_2)_3-$ | Cl | $C_2H_4OC_2H_4OH$ | golden yellow | 455 |
| 5 | $-(CH_2)_3-$ | Cl | $C_2H_4OCH_3$ | golden yellow | 455 |
| 6 | $-(CH_2)_3-$ | Cl | $C_3H_6OCH_3$ | golden yellow | 456 |
| 7 | $-(CH_2)_4-$ | Cl | $C_2H_4OH$ | golden yellow | 453 |
| 8 | $-(CH_2)_4-$ | Cl | $C_3H_6OH$ | golden yellow | 456 |
| 9 | $-(CH_2)_3O(CH_2)_2O(CH_2)_3$ | Cl | $C_2H_4OH$ | golden yellow | 452 |
| 10 | $-(CH_2)_3O(CH_2)_2O(CH_2)_3$ | Cl | $C_3H_6OH$ | golden yellow | 453 |
| 11 | $-(CH_2)_3O(CH_2)_4O(CH_2)_3$ | Cl | $C_3H_6OH$ | golden yellow | 453 |
| 12 | $-(CH_2)_3O(CH_2)_4O(CH_2)_3$ | Cl | $C_2H_4OCH_3$ | golden yellow | 452 |
| 13 | $-(CH_2)_3O(CH_2)_4O(CH_2)_3$ | Br | $C_3H_6OCH_3$ | golden yellow | 454 |

TABLE 13

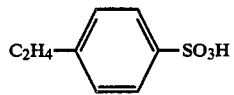

| No. | R¹ | R² | R³ | R⁴ | R⁵ | Hue | λmax (nm) |
|---|---|---|---|---|---|---|---|
| 1 | $N(CH_3)_2$ | H | H | $CH_2CH_2OH$ | $CH_2CH_2OH$ | orange | |
| 2 | $N(CH_3)_2$ | H | Cl | $CH_2CH_2OH$ | $CH_2CH_2OH$ | orange | 430 |
| 3 | $N(CH_3)_2$ | Cl | Cl | $CH_2CH_2OH$ | $CH_2CH_2OH$ | orange | 463 |
| 4 | $N(C_2H_5)_2$ | Cl | Cl | $CH_2CH_2OH$ | $CH_2CH_2OH$ | orange | 463 |
| 5 | $N(C_2H_5)_2$ | H | Cl | $CH_2CH_2OH$ | $CH_2CH_2OH$ | orange | 461 |
| 6 | $N(C_2H_5)_2$ | H | Cl | $C_3H_6OH$ | $C_3H_6OH$ | orange | 432 |
| 7 | $N(CH_3)_2$ | Cl | Cl | $C_2H_4OCH_3$ | $C_3H_6OH$ | orange | 463 |
| 8 | $N(CH_3)_2$ | Cl | Cl | $C_2H_4OCH_3$ | $C_2H_4OCH_3$ | orange | 462 |
| 9 | $N(CH_3)_2$ | Cl | Cl | $C_3H_6OCH_3$ | $C_3H_6OCH_3$ | orange | 465 |
| 10 | $N(CH_3)_2$ | Cl | Cl | $-C_2H_4-C_6H_4-SO_3H$ | $C_3H_6OCH_3$ | orange | 462 |
| 11 | $N(CH_3)_2$ | Cl | Cl | $-C_2H_4-C_6H_4-SO_3H$ | $C_2H_4OH$ | orange | 461 |
| 12 | $N(CH_3)_2$ | Cl | Cl | $-C_2H_4-C_6H_4-SO_3H$ | $C_2H_5$ | orange | 466 |
| 13 | $N(CH_3)_2$ | Cl | Cl | $-C_2H_4-C_6H_4-SO_3H$ | $-C_6H_4-OCH_3$ | orange | 467 |

TABLE 13-continued

Structure: R¹−SO₂ group on benzene ring with R², R³ substituents, SO₃H, and azo (N=N) linked to pyridine-type ring with CH₃, CN, NH−R⁴, NH−R⁵ groups.

| No. | R¹ | R² | R³ | R⁴ | R⁵ | Hue | λmax (nm) |
|---|---|---|---|---|---|---|---|
| 14 | N(C₂H₅)₂ | Cl | Cl | −C₂H₄−C₆H₄−SO₃H | o-C₆H₄-OCH₃ | orange | 467 |
| 15 | N(C₂H₅)₂ | H | H | −C₂H₄−C₆H₄−SO₃H | o-C₆H₄-OCH₃ | orange | 453 |
| 16 | N(C₂H₅)₂ | H | H | −C₂H₄−C₆H₄−SO₃H | C₆H₅ | orange | 452 |
| 17 | N(C₂H₅)₂ | H | H | C₂H₄OC₂H₄OH | C₆H₅ | orange | 452 |
| 18 | N(CH₃)₂ | H | H | C₂H₄OC₂H₄OH | C₆H₅ | orange | 452 |
| 19 | −CH₃ | H | Cl | −C₂H₄−C₆H₄−SO₃H | C₆H₅ | orange | 444 |
| 20 | −CH₃ | H | Cl | −C₂H₄−C₆H₄−SO₃H | o-C₆H₄-OCH₃ | orange | 445 |
| 21 | N(CH₃)₂ | Cl | Cl | C₃H₆OC₂H₄OCH₃ | C₃H₆OCH₃ | orange | 465 |
| 22 | NH−C₄H₉ | Cl | Cl | −C₂H₄−C₆H₄−SO₃H | −C₆H₅ | orange | 463 |

TABLE 14

Structure (Nos. 1–10): Chloro-, SO₃H-, R¹-substituted benzene ring with N=N linked to pyridone ring bearing CH₃, CN, =O, HO, N−R².

| No. | R¹ | R² | Hue | λmax (nm) |
|---|---|---|---|---|
| 1 | Cl | C₂H₄OC₄H₉ | yellow | 426 |
| 2 | Cl | C₃H₆OC₄H₉ | yellow | 427 |
| 3 | Cl | C₄H₉(n) | yellow | 428 |
| 4 | Cl | C₃H₆OC₂H₅ | yellow | 426 |
| 5 | Cl | C₃H₆OCH₃ | yellow | 427 |
| 6 | Cl | C₃H₆OC₂H₄OCH₃ | yellow | 427 |
| 7 | CH₃ | C₃H₆OC₂H₄OCH₃ | yellow | 427 |
| 8 | CH₃ | C₃H₆OCH₃ | yellow | 427 |
| 9 | CH₃ | C₃H₆OC₂H₅ | yellow | 427 |
| 10 | CH₃ | C₃H₆OC₂H₄OH | yellow | 427 |

TABLE 14-continued

Structure (Nos. 11–12): Chloro-, R¹-, SO₃H-substituted benzene ring with N=N linked to pyridone ring bearing CH₃, CN, =O, HO, N−R².

| No. | R¹ | R² | Hue | λmax (nm) |
|---|---|---|---|---|
| 11 | Cl | C₃H₆OC₄H₈OH | yellow | 427 |
| 12 | CH₃ | C₃H₆OC₄H₈OH | yellow | 427 |

TABLE 15

| No. | R¹ | R² | R³ | Hue | λmax (nm) |
|---|---|---|---|---|---|
| 1 | $C_2H_4OCH_3$ | $CH_3$ | $CH_3$ | yellow | 418 |
| 2 | $C_2H_4OCH_3$ | $C_2H_5$ | $C_2H_5$ | yellow | 419 |
| 3 | $C_3H_6OCH_3$ | $C_2H_5$ | $C_2H_5$ | yellow | 420 |
| 4 | $C_3H_6OCH_3$ | $CH_3$ | $CH_3$ | yellow | 418 |
| 5 | $C_3H_6OC_2H_5$ | $CH_3$ | $CH_3$ | yellow | 418 |
| 6 | $C_3H_6OC_2H_5$ | $C_2H_5$ | $C_2H_5$ | yellow | 420 |
| 7 | $CH_2$—⌬—$SO_3H$ | $C_2H_5$ | $C_2H_5$ | yellow | 419 |
| 8 | $C_2H_4$—⌬—$SO_3H$ | $C_2H_5$ | $C_2H_5$ | yellow | 420 |
| 9 | $C_2H_4$—⌬—$SO_3H$ | $C_4H_9(n)$ | $C_4H_9(n)$ | yellow | 422 |

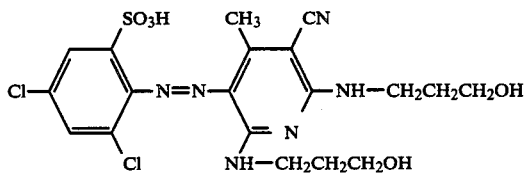

I claim:
1. A compound of the formula

wherein $X^1$ is chlorine, bromine, methyl or trifluoromethyl, $Y^3$ is chlorine or bromine, and $K^1$ is a radical of the formula

where $R^3$ is $C_2$ to $C_4$ hydroxyalkyl, methoxyalkyl or methoxypropyl.

2. The compound of claim 1, which is: